March 10, 1936.  A. P. FERGUESON ET AL  2,033,762
TIRE COVER
Filed June 10, 1935   4 Sheets-Sheet 4
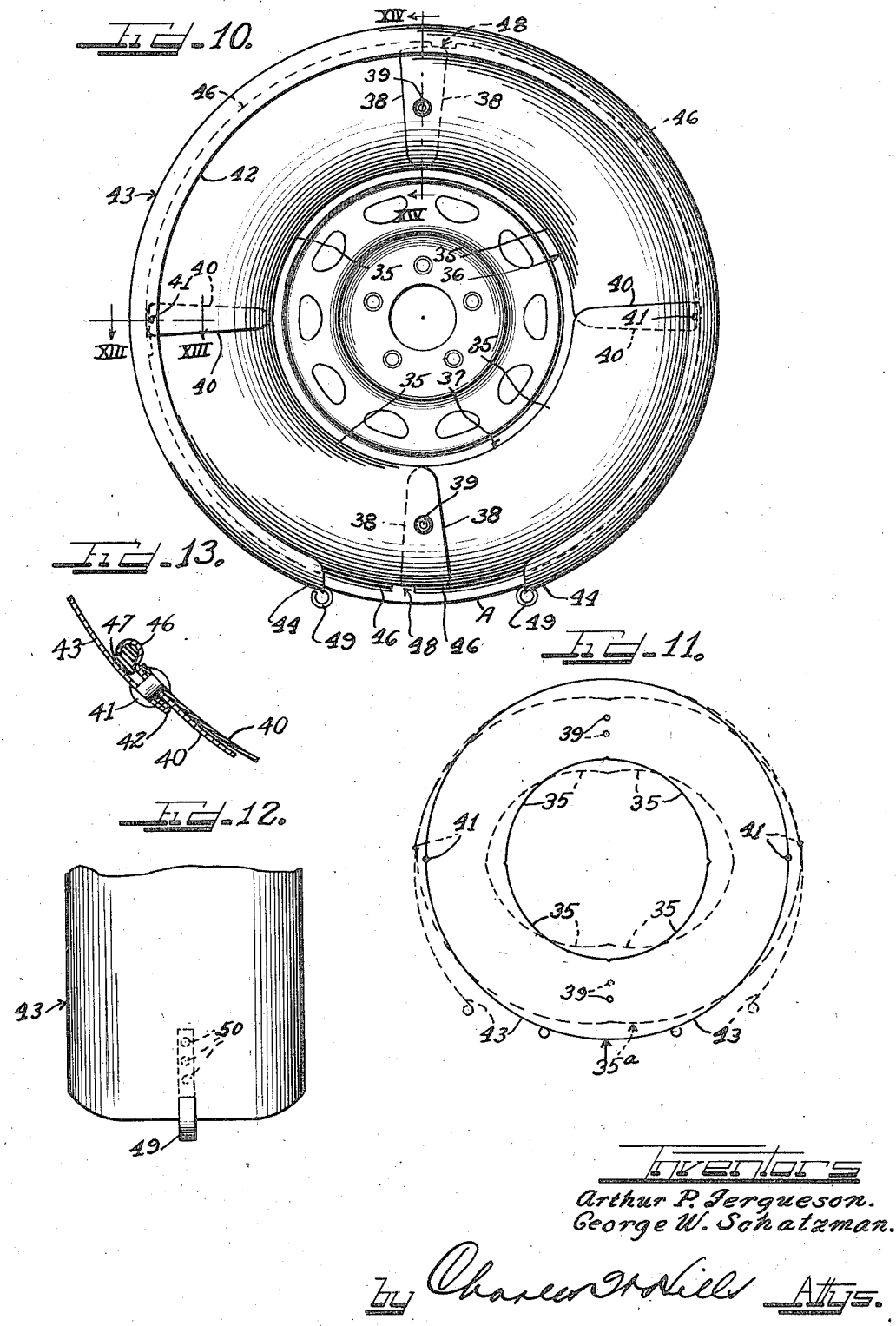
Inventors
Arthur P. Fergueson.
George W. Schatzman.
by Charles H. Wills Attys.

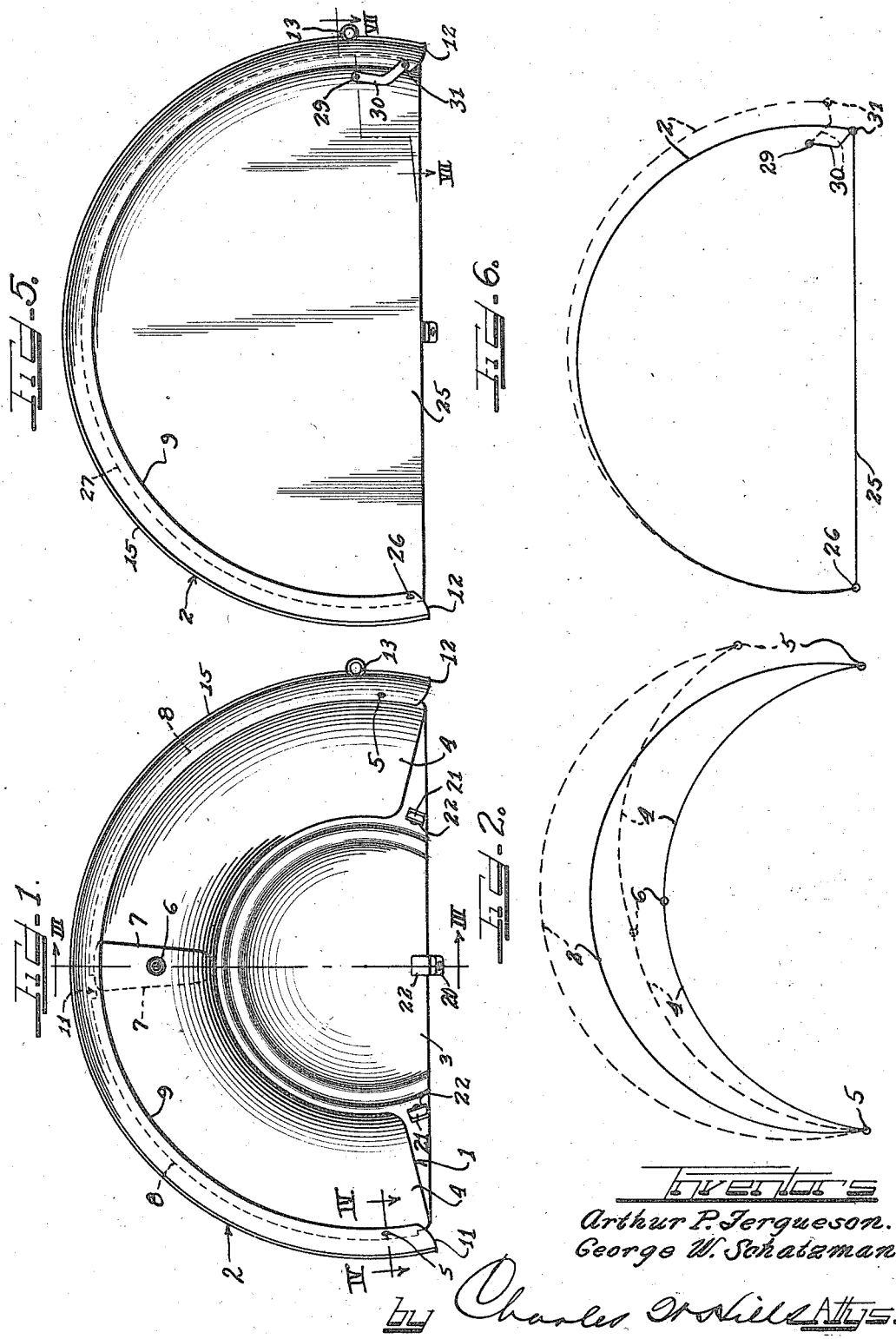

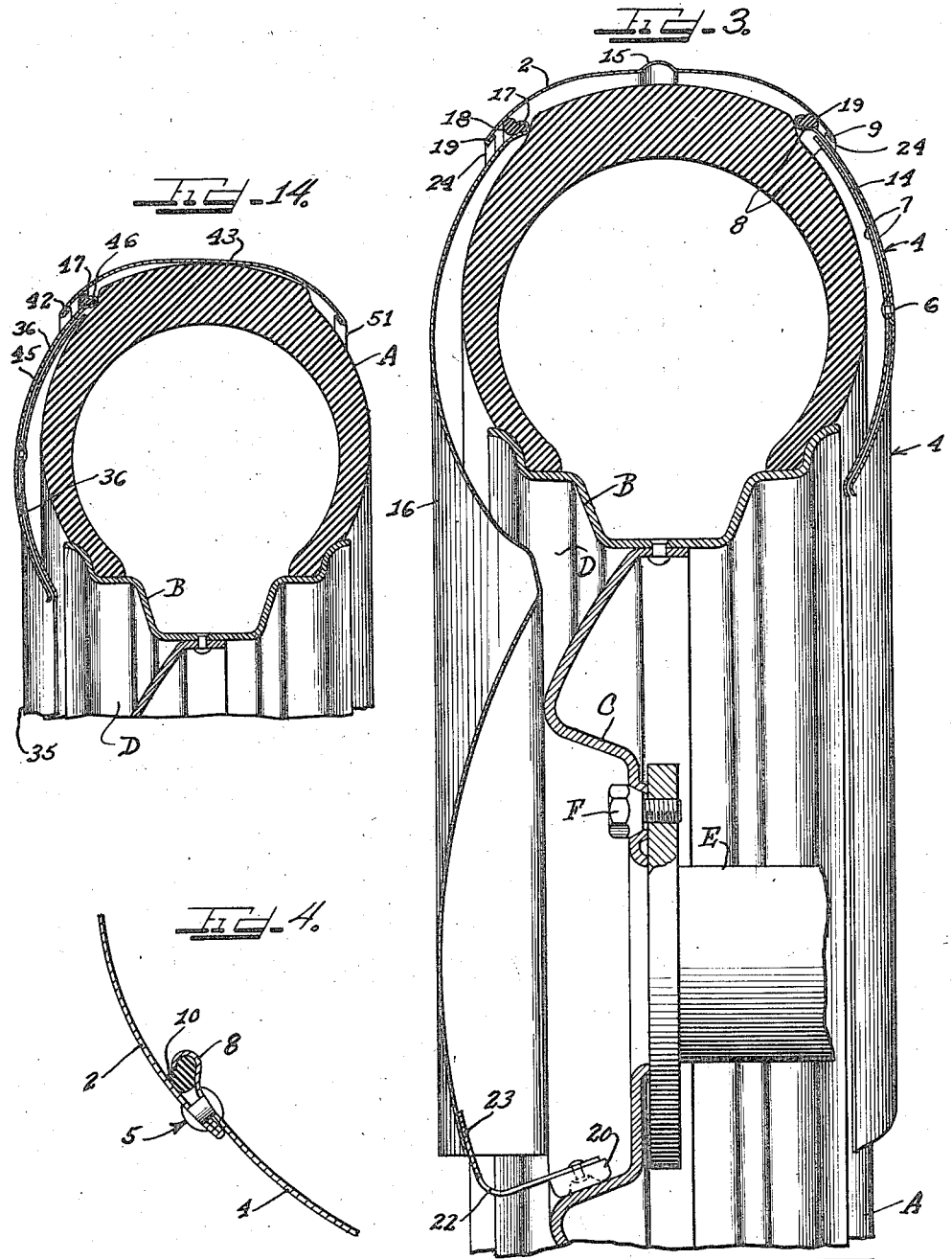

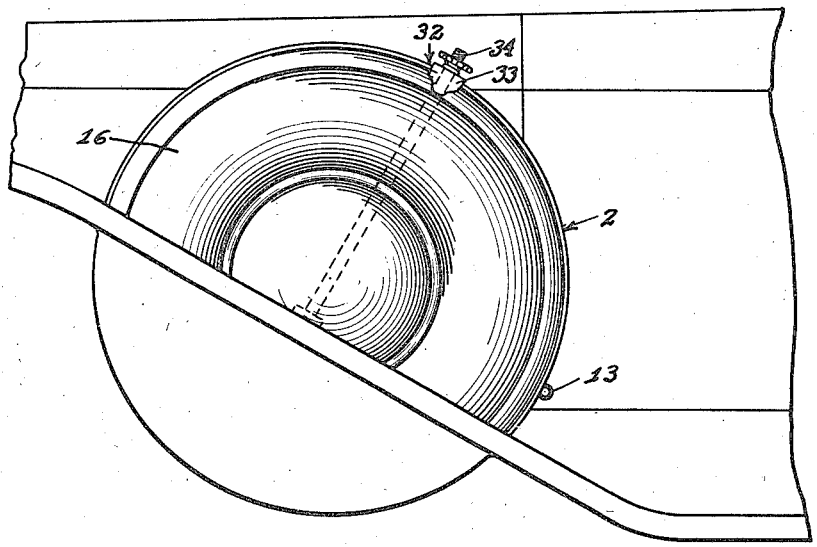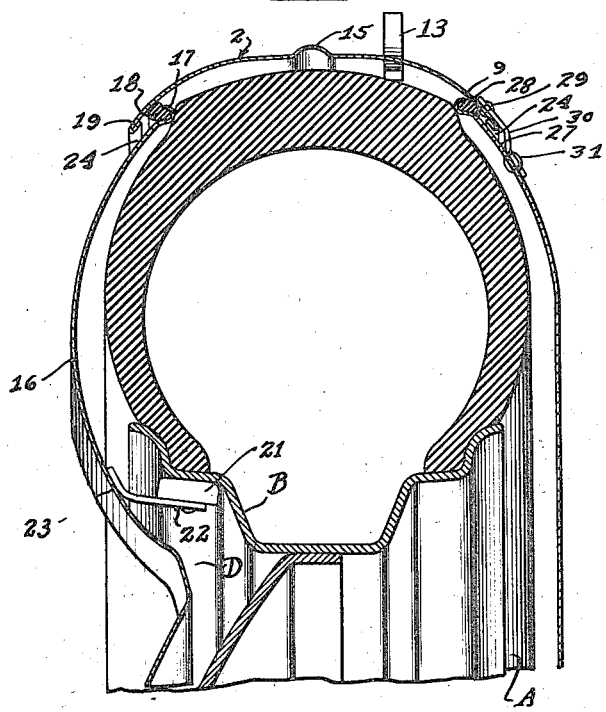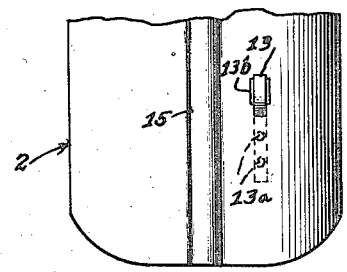

Patented Mar. 10, 1936

2,033,762

UNITED STATES PATENT OFFICE 2,033,762

TIRE COVER

Arthur P. Fergueson and George W. Schatzman, Detroit, Mich., assignors to Lyon Cover Company, Detroit, Mich., a corporation of Michigan Application June 10, 1935, Serial No. 25,738

17 Claims. (Cl. 150—54)

This invention has to do with tire covers and is concerned more particularly with the provision of a structure of this character which may be very readily assembled and disassembled, which involves a minimum of separable parts, which may be embodied in forms for use with a tire mounted in a fenderwell, for example, and also with a tire mounted as at the rear or either side from a central part of the wheel on which the tire is disposed.

More specifically, it is an object of the invention to provide a combined tread covering and side wall covering structure which is substantially form-retaining and yet is capable of a degree of flexibility necessary to enable the parts to be readily applied to and removed from proper tire protecting position with substantially a single movement in each case.

Another object of the invention is to provide a combined tread and side wall covering structure to serve as a means for retaining another side wall covering member in proper tire protecting position.

It is a further object of the invention to provide a unitary side wall and tread covering structure wherein both covering portions are flexible.

In accordance with the general features of one form of the invention, there is provided a unit comprising a resilient rim or tread covering band to which is pivotally joined a plurality of connected links extending generally radially so as to cover a side wall of the tire. When the ends of the band are spread apart, so as to clear the diameter of the tread in the application and removal of the unit, the side covering structure yields with the end portions of the band. This structure may serve to cover the front wall of the tire or it may be employed for covering the rear wall and tread of the tire, in which latter event the tread band is arranged to overlap the outer periphery of a front wall covering member to retain the same in place.

In another form, the side wall structure may be a substantially imperforate disc member, one end of which is pivotally connected to an end of the rim, and the other end is connected through a link to the other end of the rim.

Where a separate front cover member is used, said member is preferably provided with wheel engaging rests to facilitate the positioning of said member as well as to assist in holding the same in place when the aforesaid unitary cover structure is being applied and removed.

The rim member is provided at one or both ends with suitable finger hold means to facilitate the manual expansion and contraction of the rim member.

Further objects and advantages of the invention will appear as the description proceeds.

The invention (in preferred form) is illustrated in the drawings and hereinafter more fully described.

Figure 1 is a rear elevational view of one form of tire cover construction embodying the invention, adapted for use with the right hand fenderwell, for example, of an automobile.

Figure 2 is a diagrammatic view showing the different relationships of the rear wall and tread covering unit.

Figure 3 is an enlarged fragmentary sectional view taken substantially in the plane designated by the line III—III in Figure 1 and including additionally a spare wheel and carrier, and a spare tire associated therewith.

Figure 4 is an enlarged fragmentary sectional view taken substantially as indicated by the line IV—IV in Figure 1.

Figure 5 is a view similar to Figure 1 but of a modified form of the invention, for cooperation with a hold-down clamping means such as that shown in Figure 8, hereinafter referred to.

Figure 6 is a diagrammatic view of the rim and side parts of the unit appearing in Figure 5, showing in dotted lines the relationship of the parts after the structure has been flexed.

Figure 7 is an enlarged fragmentary sectional view showing the relationship of the front covering member with the tread and rear covering unit in association with a spare wheel and tire, taken substantially as indicated by the line VII—VII in Figure 5 and turned 90°.

Figure 8 is a fragmentary elevational view of the left side of an automobile with a hold-down means for cooperation with a cover structure of the type shown in Figures 5 and 7.

Figure 9 is an enlarged fragmentary elevational view of the rear end of the rim or tread covering member appearing in Figure 8.

Figure 10 is a front elevational view of another form of the invention, applicable to a spare tire and wheel mounted, for example, at the rear of an automobile.

Figure 11 is a diagrammatic view showing in full lines the relationship of the parts of Figure 10 when in proper tire protecting position, and in dotted lines the relationship of the parts during the application and removal of the cover structure.

Figure 12 is an enlarged fragmentary view of an end of the rim member of Figure 10.

Figure 13 is an enlarged fragmentary sectional view taken substantially in the plane designated by the lines XIII—XIII in Figure 10.

Figure 14 is a sectional view taken substantially in the plane designated by the lines XIV—XIV in Figure 10.

Referring now more particularly to the drawings, the invention is shown by way of one example in Figure 1. This structure comprises a rear side wall covering shield 1 and a tread covering ring or rim 2. The member 2 is preferably of an extent in excess of 180° and is form-retaining and inherently contractible so as to hug the tread portions beyond a diameter thereof, thereby holding itself as well as the shield 1 and associated front cover member 3 in place as will appear.

The shield structure 1 in this illustrated embodiment of the invention comprises a pair of links 4 pivotally connected at 5 adjacent their outer ends and the ends of the rim 2. The links 4 are also pivotally connected together at 6 at their overlapping inner portions 7. The links 4 are preferably arcuate longitudinally and concentric so that when placed together as shown in Figure 1 they present the appearance of a continuous arcuate member. The links 4 are normally held in the relationship shown in Figure 1 by virtue of the inherent contractibility of the rim 2. The outer margin 8 of each link 4 is preferably disposed within the margin 9 of the ring 2 so as to be shielded by the ring 2. For the purpose of preventing rattling, said margins 8 have clinched therein strips 10 of rubber or the like arranged to engage the inner surface of the margin 9 of the ring 2. It will be noted that the said margins adjacent the overlapping ends 7 of the links 4 are cut away as at 11 so as not to interfere with each other when the pivot connection at 6 moves in the direction of the line between the pivot connections 5.

The flexing action of the unit comprising the ring member 2 and shield links 4 may be ascertained perhaps more clearly by reference to the diagrammatic showing of Figure 2. The unit is applied to a spare tire such as a tire mounted in a fenderwell by expanding the rim 2 to an extent necessary to enable its ends 12 to clear diametrically opposite portions of the tire tread. In so expanding the rim member 2, the left end of the structure as seen in Figures 1 and 2 is preferably held relatively stationary and the right-hand end of the rim is pulled out and swung substantially in its own plane about the left pivot connection 5, bringing the parts substantially in the relationship shown in dotted lines in Figure 2. It will be noted that the shield structure permits this to be done for the reason that the links 4 pivot with respect to each other at the joint 6. It will be noted that such a flexure of the units would not be feasible, were the shield structure integral and consequently incapable of flexure in its own plane. When the parts are related as shown in dotted lines in Figure 2, the entire unit is swung downwardly about the left pivot 5, and when the unit is in position to embrace substantially the entire exposed portion of the tread, the right end 12 of the rim member 2 is released and allowed to return to a position where it and the other end 11 hug under the diametrically opposite portions of the tread, thereby holding the rim member 2 and the side shield structure 1 in proper tire covering position. Once the cover is in this position, it may be removed by again expanding the rim member 2, following substantially the same steps, but in reverse order, as those outlined above for the placing of the cover unit on the tire.

To facilitate manual flexure of the rim member 2, a finger hold 13 is preferably provided. One hold 13 may be provided at each end of the rim member 2, although it has been found in practice that only one is needed. That one is preferably located rearwardly of the vehicle so as not to be visible from the front of the car.

The rear shield and rim structure illustrated in Figure 1 is preferably applied to a tire mounted in the right fenderwell, thus locating the finger hold 13 to the rear as above noted. A structure of this character designed for a tire in the left well would preferably have the finger hold 13 at the left as viewed from the back, bearing in mind the showing in Figure 1.

The side shield links 4 are preferably concavo-convex in cross section to simulate the shape of the side wall of the tire. Accordingly, in order that the end portions 7 may be relatively pivotable, said portions are spaced apart as at 14.

The rim member 2 may be provided with a bead 15 for reinforcing as well as ornamental purposes.

The front shield for the spare wheel and tire may be of any desired construction, preferably with a shape conforming generally to that of the front of the spare wheel and tire, or even with the front of the tire alone, and arranged to be retained by the rim member. In the illustrated embodiment of one form of front shield, there is provided a plate-like member 16 whose outer margin 17 is arranged to engage the outer margin of the front wall of the tire A and has clinched thereto a contact strip 18 of rubber or other yieldable material for engaging the inner surface of the front margin 19 of the rim member 2, to prevent metal to metal contact and thus to prevent rattling.

The front shield 16 is preferably of such an extent as to cover the front portions of the tire A and wheel B exposed when the same are in a well. To assist in positioning the shield 16 in substantially co-axial relation to the spare wheel and tire, the lower part of the shield 16 is preferably provided with one or more wheel-engaging rests 20 and 21. Each rest comprises a pad mounted on a spring 22 which is spot welded or otherwise suitably secured at 23 preferably to the inner surface of the shield 16. The pad 20 is arranged to engage the inner surface of the lower part of the wheel hub C, as clearly seen in Figure 3, and the other pads 21 are adapted for engagement with lower portions of the generally frusto-conical inner surface D forwardly of the drop center portion of the wheel rim. The rests are arranged so that when in engagement with the portions of the hub and rim referred to, they locate the shield 16 in coaxial relation to the wheel and tire. After the shield 16 is in place as shown in Figure 3 and the rear and rim covering unit also in place as therein shown, the entire cover structure is held in place by virtue of the contraction of the rim member 2, effectively shielding substantially the entire exposed portions of the tire and the front exposed portion of the wheel.

With the construction just described, the wheel may be mounted at its hub on a suitable spare wheel carrier E by bolts or other suitable means F, the carrier E being preferably permanently mounted on the automobile body. Of course, if desired, the spare wheel and tire could be placed in the fenderwell and held in place by a holddown means such as that shown in Figure 8, engaging the rim member 2.

A pivot connection 5 is shown in detail in Figure 4.

In order to avoid rough edges, the margins of the rim member 2 are preferably return bent as shown at 24.

A somewhat modified rear and rim cover structure is shown in Figures 5 to 9. In this construction, instead of providing a pair of links such as the links 4, there is provided a single back plate link member 25 having one end pivotally connected at 26 by means like the connections 5 in Figure 1. The plate 25 has a part-circular rear margin 27 formed to be overlapped by the rear margin 9 of the inherently contractible resilient rim member 2, and has clinched thereto an antirattle cushion strip 28 of rubber or the like, for engagement with the inner surface of said margin 9 of the rim member 2.

The pivot connection 26 constitutes the only direct connection between the rim member and the plate 25. The other end of the plate 25 pivotally carries at 29 a link member 30 whose opposite end is pivotally connected to the adjacent end 12 of the rim member 2 as shown at 31. This link connection permits the adjacent end 12 of the rim member 2 to be swung away from the adjacent portion of the plate 25, so that the ends 12 of the rim member may be separated to an extent necessary to clear diametrically opposite portions of the tread of the tire so that the unit may be readily applied to and removed from proper tire protecting position. Figure 6 shows in dotted lines the positions of the rim member and link 30 with respect to the plate 25 when the rim member is extended to enable the unit to be applied to and removed from proper tire protecting position. While the link 30 permits this relative movement, it also acts as a retaining means to hold the parts together as a unit applicable and removable without separation.

The link 30 and associated structure, and the manner in which the rim and rear covering unit cooperates with the front shield, and the cooperation of one of the rests and the front shield with the rim surface D are shown in detail in Figure 7. The shield 16 and its cooperation with the wheel and rim member is the same as that previously described in connection with the form of the invention appearing in Figures 1, 2 and 3.

Inasmuch as the plate 25 extends over at least a part of the hub of the wheel, this form of the invention lends itself to employment with a holddown means such as that illustrated generally at 32 in Figure 8, wherein an adjustable rim member engaging clamp plate 33 is mounted on a standard 34 supported at the rear of the well. Of course, any other suitable mounting or holding means may be employed.

In this, as in the previously described form of the invention, a finger hold 13 is preferably provided, and its arrangement is shown somewhat in detail in Figure 9. The hold 13 is preferably spot welded at 13a or otherwise suitably secured preferably on the inside of the rim member 2 and preferably at the rear of the median plane of the rim member, and is extended outwardly through a slot 13b in said member.

Another modification of the invention embodying principles similar to those governing the operation of the form appearing in Figure 1 is illustrated in Figures 10 to 13. In this construction, adapted for a tire on a wheel mounted centrally thereof on a spare wheel carrier such as is usually found at the rear of a car, an endless front shield 35a is formed of a generally circular linkage including the links 35 assembled essentially in two groups or pairs. In the illustrated embodiment of the invention, the shield linkage 35a is formed in two pairs, an upper pair 36 and a lower pair 37. These pairs are substantially identical with each other, the links of each pair being lapped at 38 and pivotally connected at 39 to permit articulation between them. The ends 40 of the sections 36 and 37 remote from the pivot connections 39 are pivotally connected at 41 together and also to substantially diametrically opposite portions of the front margin 42 of a tread covering member 43.

The tread covering member 43 is preferably an inherently contractible resilient split ring whose ends 44 are preferably spaced apart and arranged, when in operative position, substantially lowermost adjacent the pivot connection 39 for the lower link section 38. The tread covering member 43 is not connected to the shield structure except at the substantially diametrically opposite points 41. Articulation of the lapped portions of the respective links is possible notwithstanding the transverse concavo-convex shape of the links because of the fact that these overlapping portions are spaced apart as shown at 45 in Figure 14. To prevent rattling between the shield structure and the tread covering member 43, the outer margins 46 of the links 35 are provided with cushion strips 47, spaced apart as at 48 so as not to interfere with the articulation of the links. To facilitate expansion of the rim member 43, suitable finger holds 49 are spot welded as at 50 or otherwise suitably secured to the ends 44 of the tread covering member 43.

Figure 11 shows diagrammatically in full lines the relationship of the cover structure as, for example, when the same is applied in proper tire protecting position, and in dotted lines the relationship assumed by the parts upon expansion of the tread covering member 43. As thus expanded, the tread covering member and the articulated side covering shield structure are arranged for application onto or removal from the tire. It will be noted that upon spreading apart of the ends 44, the pivot connections 41 are correspondingly separated to the extent necessary to enable the rear margin 51 (see Figure 14) to be swung forwardly and passed across diametrically opposite portions of the tread of the tire. Spreading apart of the opposite portions of the margin 51 is made possible due to the fact that the side shield structure is otherwise free of the rim member 43, and upon expansion of the member 43 the pivot connections 39 approach each other as clearly shown in dotted lines in Figure 11.

Thus when it is desired to place the cover structure on the tire, the unit is first positioned with the intermediate or upper part of the rim member overlying the upper part of the tread in a position to be hooked thereover. The hooking is thereupon performed by grasping the loops 49 and spreading the ends 44 of the rim member apart, thereby expanding said member to such an extent as to enable the diametrically opposite portions of its rear margin 51 to swing downwardly and rearwardly across the diametrically opposite lateral tread portions. When this is done, the top of the rim member readily hooks over the top of the tire tread, the side shield swings downwardly and rearwardly into position over the front wall of the tire and the end portions of the rim member are allowed to inherently contract into position to hug under the tire tread and resiliently hold the shield in proper tire protecting position. The form of the invention just described is adapted for covering the front wall of the tire, and while those forms of units above described may be likewise employed to cover the front and tread of a tire, they are preferably employed for the rear and tread of the tire, in conjunction with a front shield such as the shield 16. The number of links 35 in the form of Figures 10 to 14 and the number of links in the other forms may be varied to the extent desired, the number herein included being employed for illustrative purposes only.

It is apparent from the foregoing that the invention may be embodied in structures which are very neat and attractive in appearance, and are very readily applied to and removed from tire covering position by substantially a single operation in each case. The construction is such as to greatly facilitate assembly of the entire cover structure with the spare wheel and tire and also the disassembly thereof.

We are aware that many changes may be made and numerous details of construction may be varied through a wide range without departing from the principles of this invention, and we, therefore, do not purpose limiting the patent granted hereon otherwise than necessitated by the prior art.

It will be understood that a hole may be provided in the front shield such as the shield 16, to be positioned in front of the tire valve so that access may be had to the valve for pumping up the tire without necessitating removal of the cover from the tire.

The links 4 and shield 25 may terminate short of the ends of the rim member such as the member 2, if desired, and need not be substantially coterminous as shown, since the principles of the invention will be substantially unaffected by such change.

We claim as our invention:

1. A tire cover construction comprising a side wall covering member and an arcuate, resilient, substantially form-retaining tread covering rim member of slightly more than 180° in extent, said members being pivotally connected together at the end portions of one of said members for relative movement substantially in the plane of the tire when in proper tire protecting position, said rim member being normally contracted so as to hug under diametrically opposite portions of the tire and hold the cover thereon and being expansible to clear said opposite portions so as to be removed with the side covering member as a unit from the tire, said end portions being flexibly connected together so as to yield and thus not interfere with expansion and contraction of the tread covering member.

2. A tire cover construction comprising a side wall covering member and an arcuate, resilient, substantially form-retaining tread covering rim member of slightly more than 180° in extent, said members being pivotally connected together at the end portions of one of said members for relative movement substantially in the plane of the tire when in proper tire protecting position, said rim member being normally contracted so as to hug under diametrically opposite portions of the tire and hold the cover thereon and being expansible to clear said opposite portions so as to be removed with the side covering member as a unit from the tire, said end portions being substantially rigid and flexibly connected together so as to yield and thus not interfere with expansion and contraction of the tread covering member.

3. A tire cover construction comprising a closed linkage including a one piece resilient rim of more than 180° in extent and a plurality of side wall covering links connected together and to end portions of the rim and held by the rim in substantially arcuate shape in conformity with the shape of the rim, so as to be operative together as a unit in covering adjacent tread and side wall portions of the tire and to be applied to and removed from the tire as a unit, said side links being relatively pivotable so as not to interfere with expansion and contraction of the rim.

4. A tire cover construction comprising a side wall covering member and an arcuate, resilient, substantially form-retaining tread covering rim member of slightly more than 180° in extent, said members being pivotally connected together at the end portions of one of said members for relative movement substantially in the plane of the tire when in proper tire protecting position, said rim member being normally contracted so as to hug under diametrically opposite portions of the tire and hold the cover thereon and being expansible to clear said opposite portions so as to be removed with the side covering member as a unit from the tire, said end portions being flexibly connected together so as to yield and thus not interfere with expansion and contraction of the tread covering member, said side covering member being arranged to cover the rear side wall of the tire, and a front shield having an outer peripheral margin engageable between the front margin of the rim member and the tire so as to be retained in proper cooperative relation with the tire by said rim member.

5. A tire cover construction comprising a closed linkage including a one piece resilient rim of more than 180° in extent and a plurality of side wall covering links connected together and to end portions of the rim and held by the rim in substantially arcuate shape in conformity with the shape of the rim, so as to be operative together as a unit in covering adjacent tread and side wall portions of the tire and to be applied to and removed from the tire as a unit, said side links being relatively pivotable so as not to interfere with expansion and contraction of the rim, said links being arranged to cover the rear wall of the tire, and a front shield having an outer peripheral margin engageable between the front margin of the rim member and the tire so as to be retained in proper cooperative relation with the tire by said rim member.

6. A tire cover comprising a split rim member of more than 180° in extent and formed to resiliently hug under diametrically opposite portions of the tread of the tire, a side cover structure extending circumferentially along and including end parts movably connected to the rim member and together and extending inwardly in a general radial direction for disposition over a side wall of the tire, said side cover structure having a knee action tending to straighten when the rim member is expanded.

7. A tire cover comprising a split rim member of more than 180° in extent and formed to resiliently hug under diametrically opposite portions of the tread of the tire, a side cover structure extending circumferentially along and including end parts movably connected to the rim member and together and extending inwardly in a general radial direction for disposition over a side wall of the tire, said side cover structure having a knee action tending to straighten when the rim member is expanded, said side covering structure being formed to engage the tire outwardly radially beyond the widest wall portion of the tire so as to exert a lifting force on the rim member as said member is expanded.

8. A tire cover construction comprising an arcuate expansible and contractible tread-covering rim exceeding 180° in extent and formed to hug the tread and accommodate treads of different diameters, and a side plate structure formed to shield a side wall of the tire, said structure comprising a closed linkage of the lazy tong type with opposed portions thereof connected to said rim so as to articulate generally radially without interfering with expansion and contraction of said rim.

9. A tire cover construction comprising an arcuate expansible and contractible tread-covering rim exceeding 180° in extent and formed to hug the tread and accommodate treads of different diameters, and a side plate structure formed to shield a side wall of the tire, said structure comprising a closed linkage of the lazy tong type with opposed portions thereof connected to only substantially diametrically opposite parts of said rim so as to articulate in a generally radial plane without interfering with expansion and contraction of said rim.

10. A tire cover unit comprising a disc-like part for shielding a side of a spare wheel and tire thereon, a tread covering rim, circumferentially spaced pivot connections between said part and rim, one of said connections being loose to afford limited separative and approaching movement of the rim and part at said one connection, said rim having an extent in excess of 180° and being formed to resiliently hug the tire to hold itself and said part in place and being expansible without interference by said part to an extent necessary for the rim to clear the tread in its movements onto and off the tire.

11. A tire cover construction comprising a resilient rim of more than 180° in extent and formed to hug the tread to hold itself thereon, a side shield connected to spaced portions of the rim so as to be movable with the rim as a unit, said shield comprising parts joined by a flexible connection disaligned with said portions so as to enable said parts to articulate upon expansion and contraction of the rim.

12. A tire cover construction comprising a resilient rim of more than 180° in extent and formed to hug the tread to hold itself thereon, a side shield connected to spaced portions of the rim so as to be movable with the rim as a unit, said shield comprising parts joined by a flexible connection disaligned with said portions so as to enable said parts to articulate upon expansion and contraction of the rim, and cushion means connected between said rim and parts to prevent rattling therebetween.

13. A tire cover construction comprising a resilient rim of more than 180° in extent and formed to hug the tread to hold itself thereon, a side wall covering part pivotally connected to a portion of the rim so as to be movable therewith as a unit, and a link pivotally connected to another portion of the rim and also to the first mentioned part, said connections being disaligned, so as to enable said parts to articulate upon expansion and contraction of the rim.

14. In a spare wheel and tire cover assembly, a front shield shaped to conform substantially with the front outline of the spare wheel and tire, and means disposed only on one side of a diameter of the shield and engageable with the wheel at points bearing the same relation to the axis of the wheel that said means bears to the axis of the shield, whereby to rest the shield on and in coaxial relation to the wheel.

15. A tire cover construction comprising a resilient tread covering rim of more than 180° in extent and formed to inherently contract about the tread of the tire to hold itself thereon, a rear tire side wall covering shield of more than 180° in extent and flexibly connected to the rim in position to cooperate with the rim in covering adjacent tread and rear side wall portions of the tire, while allowing the rim to be expanded relative to the shield to an extent necessary to enable the rim to clear diametrically opposite portions of the tread to enable the unit to be applied to and removed from the tire.

16. A multi-part tire cover for protecting a spare tire, including an open bottom flexible circular rim part formed to extend circumferentially about more than one-half of the outer periphery of the tire, a side plate structure for disposition over a side wall of the spare tire, and means connecting only spaced end portions of said rim part to the side plate structure to permit of relative movement of the rim part and side plate structure and to enable the opening and closing of said rim part on the tire without disconnecting said connecting means, and whereby the cover may be removed bodily as a single unit from the tire.

17. A multi-part tire cover for protecting a spare tire, including a split circular rim part formed to extend circumferentially about more than one-half the outer periphery of the tire, a side plate for disposition over an outer side wall of the tire, a side plate structure for disposition over a rear side wall of the spare tire, and means connecting spaced end portions of said rim part to the side plate structure to permit of relative movement of said rim part and side plate structure, and to enable the opening and closing of said rim part with respect to the tire without necessitating the disconnection of said connecting means.

ARTHUR P. FERGUESON.
GEORGE W. SCHATZMAN.